United States Patent Office 3,338,868
Patented Aug. 29, 1967

3,338,868
ROOM TEMPERATURE ORGANOPOLYSILOXANE COMPOSITIONS
John C. Goossens, Scotia, N.Y., assignor to General Electric Company, a corporation of New York
No Drawing. Filed May 3, 1965, Ser. No. 452,918
3 Claims. (Cl. 260—46.5)

The present invention relates to room temperature vulcanizing organopolysiloxane compositions. More particularly, the present invention relates to a method utilizing certain organosilicon materials having hydrolyzable radicals attached to silicon to effect the polymerization of silanol-terminated organopolysiloxanes, and the vulcanization of the resulting organopolysiloxane polymers.

Room temperature vulcanizing organopolysiloxane compositions have shown significant promise in a variety of applications. Particularly desirable results have been achieved in molding applications. The advantage achieved by using such elastomeric forming materials in making molds, is that a resilient mold can be made by merely pouring the curable organopolysiloxane composition onto a pattern and allowing the curable composition to cure. Although room temperature curable organopolysiloxane compositions have been successfully utilized in molding applications, experience has shown that after the organopolysiloxane mold has been used to cast models for a few times, it often becomes difficult to remove the cast model from the mold without damaging the mold. In addition, voids can be produced in molds made from conventional room temperature vulcanizing organopolysiloxane composition as a result of air entrapped in the composition prior to cure.

One of the principal reasons why the removal of a cast part from a mold made from conventional room temperature vulcanizing organopolysiloxane compositions can result in mold damage after the mold has been used for only a few times, is that the mold does not possess a satisfactory degree of toughness. The term "toughness" is often used by those skilled in the art to describe the ability of an organopolysiloxane elastomer to resist damage due to abrasion. As utilized hereinafter, the term "toughness" will represent the product of ultimate tensile strength (p.s.i.) and elongation (percent).

Experience has shown that molds made from prior art organopolysiloxane compositions vulcanizable at room temperature generally have satisfactory tensile (p.s.i.), but do not have a satisfactory degree of elongation. Those skilled in the art know that in order to satisfactorily resist damage, organopolysiloxane molds should have an ultimate elongation of at least 300%.

It has been found that organopolysiloxane elastomers having improved elongation can be made by increasing the chain length of the polymer and cross-linking it in a suitable manner. However, in order to minimize excessive build-up in the viscosity of room temperature vulcanizing organopolysiloxane compositions, particularly in filled systems, relatively low viscosity base polymer is employed. Sufficient fluidity in the curable mixture is needed to reduce air entrapment and to completely fill recesses in complex patterns. As a result molds made from conventional room temperature vulcanizing organopolysiloxane compositions generally do not possess a satisfactory degree of toughness; viscosity limitations of the curable mixture do not allow for base polymer having sufficient chain length and elastomers having a satisfactory degree of elongation.

The present invention is based on the discovery that a mixture of organosilicon materials having hydrolyzable radicals attached to silicon including certain aminosilanes, acyloxysilanes or mixtures thereof, as shown by the formula (1) $R_aG_bSiY_{4-(a+b)}$ and a silanol-terminated polydiorganosiloxane consisting essentially of chemically combined units of the formula (2) $R'_2SiO$ provide for room temperature vulcanizing organopolysiloxane compositions useful for making elastomers having a high degree of elongation, where R is selected from a monovalent hydrocarbon radical and halogenated monovalent hydrocarbon radicals, R' is selected from R and cyanoalkyl radicals, G is selected from R and hydrogen, Y is a monovalent hydrolyzable radical selected from NR″R‴, a heterocyclic amine, and OCOR″, R″ is selected from alkyl radicals and cycloalkyl radicals, R‴ is selected from hydrogen and R″, a is a whole number equal to 0 to 2, inclusive, b is a whole number equal to 0 or 1, and the sum of a and b is equal to 0 to 2, inclusive.

There is provided by the present invention room temperature vulcanizing organopolysiloxane compositions comprising by weight (A) 100 parts of a silanol-terminated polydiorganosiloxane consisting essentially of chemically combined units of Formula 2, (B) 0.1 to 100 parts, and preferably from 1 to 25 parts, of a mixture consisting of, (a) 100 parts of a member selected from difunctional silanes of the formulae, (3) $RGSiX_2$; $RHSiQ_2$ and (b) 0.1 to 50 parts of a polyfunctional silane of the formula, (4) $R_bSiY_{4-b}$ where R, G and Y are as defined above, X is a radical selected from NR″R‴ and a heterocyclic amine, and Q is OCOR″.

Radicals included by R of Formula 1 are for example, monovalent aryl radicals and halogenated monovalent aryl radicals such as phenyl, xylyl, chlorophenyl, naphthyl; aralkyl radicals such as benzyl, phenylethyl, aliphatic and cycloaliphatic, such as alkyl, alkenyl, cycloalkyl, haloalkyl, such as methyl, propyl, chloropropyl, vinyl, allyl, trifluoropropyl, cyclohexyl, cycloheptyl, etc. Radicals included by R' are all of the aforementioned R radicals as well as cyanoalkyl radicals, such as cyanoethyl, cyanopropyl, cyanobutyl, cyanopropyl, etc. Radicals included by R″ are all of the aforementioned alkyl and cycloalkyl radicals included by R. In the above formulae, where R, R', R″, R‴, Y, G, X and W can represent more than one radical, these radicals can be all the same or any two or more of the aforementioned radicals respectively.

Methods for making the organosilicon materials included by Formula 1 are well known. For example, methods for making aminosilanes are shown by Johannson Patent 2,429,883. Some of the difunctional aminosilanes shown by Formula 3, are for example, bis-(dimethylamino)dimethylsilane, bis-(isopropylamino)methylvinylsilane, bis-(methylamino)methylethylsilane, bis-(pyrrolidino)methylphenylsilane, bis-(piperidino)dimethylsilane, bis-(morpholino)diphenylsilane, bis-(isopropylamino)dimethylsilane, bis-(ethylamino)dimethylsilane, bis-(diethylamino)methylsilane; polyfunctional aminosilanes included by Formula 4 are for example, tris-(dimethylamino)methylsilane, tris-(isobutylamino)ethylsilane, tris-(isopropylamino)methylsilane, tetrakis-(isopropylamino)silane, tris-(methylamino)phenylsilane, tris-(ethylamino)vinylsilane, etc.

Acyloxysilanes and methods for making them are well known to those skilled in the art. For example, as shown by C. Eaborn, Organosilicon Compounds, Butterworth Scientific Publications, London (1960), on page 312, halosilanes can be reacted with acyl acid anhydride. Some of the difunctional acyloxysilanes included by Formula 3 are for example, methyldiacetoxysilane, vinyldiacetoxysilane, phenyldiacetoxysilane, methyldipropionoxysilane, phenyldibutryoxysilane, phenyldipropionoxysilane, etc. Polyfunctional acyloxysilanes included by Formula 4 are for example, methyltriacetoxysilane, ethyltriacetoxysilane, phenyltriacetoxysilane, etc.

The silanol-terminated polydiorganosiloxane consisting essentially of chemically combined units of Formula 2 can have a viscosity in the range of between 100 centipoises at 25° C. to as high as 50,000 centipoises, and preferably 500 centipoises to 25,000 centipoises. These materials can be made by effecting the polymerization of cyclic diorganosiloxanes consisting essentially of chemically combined units of Formula 2 such as octamethylcyclotetrasiloxane, mixtures of octamethylcyclotetrasiloxane and octaphenylcyclotetrasiloxane, etc. The equilibration of such cyclics can be effected with a siloxane rearrangement catalyst such as potassium hydroxide, tetrabutylphosphonate, etc., at a temperature in the range of between about 125° C. to about 150° C.; there can be added to the resulting high molecular weight polymer, increments of water which can be in the form of steam under pressure, until a product having a desirable viscosity is produced. In addition to units of Formula 2 the silanol-terminated polydiorganosiloxane can contain minor amounts of organosiloxy units such as methylsiloxy units, etc.

In addition to being employed in molding applications, the room temperature vulcanizing compositions of the present inventions can be employed as a caulking compound, roof sealant, encapsulant, etc. In order to provide for organopolysiloxane elastomers having improved toughness, fillers can be utilized in combination with the silanol-terminated polydiorganosiloxane and the organosilicon material of Formula 1. Preferably, there are utilized in combination with organosilicon materials having hydrolyzable radicals joined to silicon by silicon-nitrogen linkages, fillers such as titanium dioxide, albacar, ferric oxide, etc. Organosilicon materials having acyloxy radicals attached to silicon are preferably employed in combination with silica fillers such as fumed silica, precipitated silica, diatomaceous earth. A proportion of from 10 to 300 parts of filler, per 100 parts of silanol-terminated polydiorganosiloxane can be utilized. Curing accelerators such as tin octoate, dibutyltindilaurate, etc., also can be employed.

As taught in my copending applications Ser. Nos. 452,919 and 452,933, filed concurrently herewith, and assigned to the same assignee as the present invention, contact between a silanol-containing organopolysiloxane, such as the silanol-terminated polydiorganosiloxane consisting essentially of chemically combined units of Formula 2, and organosilicon material having hydrolyzable radicals as shown by Formula 1 result in the formation of a siloxane linkage and a corresponding acid or amine by-product as shown by the following equation

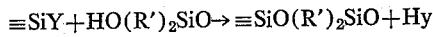

One theory, as shown by the above equation, is that the difunctional silane provides for a linear build-up of the silanol-terminated polydiorganosiloxane, while the polyfunctional silane provides for cross-linking at terminal sites. Intercondensation between ≡SiY and HOSi≡ can be effected at temperatures in the range of between −20° C. to 200° C.

In the practice of the invention, the room temperature vulcanizing organopolysiloxane compositions can be made by mixing the silanol-terminated polydiorganosiloxane, hereinafter referred to as "silanol polymer" and organosilicon materials having hydrolyzable radicals attached to silicon hereinafter referred to as the "hydrolyzable silane," which can include, unless otherwise identified, difunctional and polyfunctional silane, for example, aminosilanes, acyloxysilanes, or mixtures thereof within previously indicated weight proportions. Preferably there is utilized, from 0.5 to 25 parts of polyfunctional silane, per 100 parts of the difunctional silane.

Experience has shown that optimum results can be achieved if the components of the mixture consisting of the silanol polymer, the hydrolyzable silane, filler etc., are not exposed to excessive amounts of moisture since the hydrolyzable silane can readily hydrolyze to silanol and hydrolysis product. It has been found that if moisture is substantially precluded from the resulting room temperature vulcanizing organopolysiloxane composition, to provide no more than 100 parts of water, per million parts of mixture, the composition can remain stable for extended periods of time, such as 6 months or more at a temperature between 0° C. to 100° C. Cure of the composition can be effected by exposing it to moisture, preferably moisture in the atmosphere, to effect the hydrolysis of terminal hydrolyzable radicals which will be referred to hereinafter as "Y" radicals, to effect intercondensation between Y radicals and silanol.

Depending upon the application to which the room temperature vulcanizing organopolysiloxane composition is to be utilized, there can be varied the viscosity of the silanol polymer, the type of hydrolyzable silane utilized, the order of addition in which the various components are mixed together, etc. The hydrolyzable silane, can be added as a mixture to the silanol polymer; the difunctional hydrolyzable silane and the polyfunctional silane also can be mixed separately with the silanol polymer.

Experience has shown that optimum results can be obtained if there is utilized sufficient hydrolyzable silane in combination with silanol polymer to provide for at least one Y radical, per silanol radical, of the silanol polymer. Excess amounts of hydrolyzable silane, such as an amount sufficient to provide for up to 10 or more Y radicals per silanol radical in the mixture has been found to result in longer cure time, as well as longer pot life. In such circumstances, if it is desired to accelerate the cure time, or shorten the pot life, the room temperature vulcanizing composition can be stripped of excess hydrolyzable silane or a curing accelerator can be utilized. Cure times of 1 hour or less to 24 hours or more are not unusual therefore, depending upon the amount and nature of the hydrolyzable silane employed as well as the viscosity of the silanol polymer, the thickness of the sample desired, etc.

In some instances, it may be desired to utilize hydrolyzable silane consisting of a mixture of aminosilane and acyloxy silane. In such instances, experience has shown that temperatures below 20° C. are preferably utilized, while the hydrolyzable silane, the silanol polymer, and other ingredients are being mixed to produce the room temperature vulcanizing organopolysiloxane composition.

In order that those skilled in the art will be better able to practice the invention, the following examples are given by way of illustration and not by way of limitation. All parts are by weight.

*Example 1*

There were added about 5 parts of hydrolyzable silane to 100 parts of a silanol-terminated polydimethylsiloxane having a viscosity of about 3,000 centipoises at 25° C. The hydrolyzable silane consisted of a mixture of 8 parts of tris - (isopropylamino)methylsilane (T), per 100 parts of bis - (dimethylamino)dimethylsilane (D). The same procedure was repeated except the hydrolyzable silane consisted of a mixture of 4 parts of T, per 100 of D.

The mixtures were poured onto a smooth metal surface and allowed to cure under atmospheric conditions. Test slabs were then cut from sheets of the resulting cured products. The slabs were found to have substantially the same tensile (p.s.i.) as obtained from conventional unfilled room temperature vulcanizing compositions. The table below shows the results obtained when the slabs were tested for elongation percent E.

| Hydrolyzable Silane | | E |
|---|---|---|
| T | D | |
| 4 | 100 | 1,200 |
| 8 | 100 | 700 |

*Example 2*

There were added 0.7 part of methyldiacetoxysilane to 40 parts of a silanol-terminated polydimethylsiloxane having a viscosity of 15,000 centipoises at 25° C. The addition of the hydrolyzable silane to the silanol polymer was performed rapidly and under substantially anhydrous conditions. After 20 hours at room temperature, the mixture attained a constant viscosity indicating that the polydimethylsiloxane had been completely end-blocked with methylacetoxysiloxy units. There was added to the resulting mixture 0.5 part of methyltriacetoxysilane. The resulting mixture was then poured onto a smooth metal surface and allowed to cure under atmospheric conditions. After 48 hours, a strip was cut from the resulting cured sheet. The strip showed a satisfactory tensile strength and an elongation before break of about 500%.

*Example 3*

There is added to a mixture of 10 parts of a silanol-terminated polydimethylsiloxane and 4 parts of titanium dioxide, 0.5 part of hydrolyzable silane composed of a mixture having a proportion of 8 parts of tris - (isopropylamino)methylsilane, per 100 parts of bis-(dimethylamino)dimethylsilane. The resulting mixture is poured onto a smooth metal surface; it cures after being exposed to the atmosphere for 48 hours.

A slab is cut from the cured sheet. It shows about the same tensile (p.s.i.) and significantly improved elongation (percent) over similar conventionally cured room temperature vulcanizing compositions containing the same weight proportion of titanium oxide.

*Example 4*

Hydrolyzable silane in the form of a mixture of bis-(dimethylamino)dimethylsilane (D) and tetra - (isopropylamino)silane (Q') was added to a silanol-terminated polydimethylsiloxane having a viscosity of 700 centipoises at 25° C. The resulting mixture contained 0.5 part of D, and 0.1 part of Q', per 10 parts of the silanol polymer. The mixture was poured onto a smooth metal surface and allowed to cure under atmospheric conditions. A slab was cut from the cured sheet after 48 hours. It showed a satisfactory tensile (p.s.i.) and an elongation of 350%.

Based on the above results, those skilled in the art would know that the present invention provides for room temperature vulcanizing organopolysiloxane compositions which provide for organopolysiloxane elastomers having satisfactory tensile (p.s.i.), and significantly improved elongation (percent). These room temperature vulcanizing compositions can be stored for extended periods of time such as 6 months or more, at temperatures in the range of between 0° C. to 100° C. In addition, these room temperature vulcanizing compositions can be utilized in a variety of useful applications such as for production of organopolysiloxane molds, sealants, caulking applications, etc.

While the foregoing examples have of necessity been limited to only a few of the very many variables within the scope of the present invention, it should be understood that the present invention covers a much broader class of hydrolyzable silanes and mixtures thereof shown by Formula 1, and silanol-terminated polydiorganosiloxanes consisting essentially of chemically combined units of Formula 2. All of these materials are prepared by methods specifically illustrated in the examples above, and described further in the foregoing description of the present invention.

What I claim as new and desire to secure by Letters Patent of the United States is:

1. Compositions protected from moisture and curable to the solid, elastic state upon exposure to moisture consisting essentially of the product of reaction of (A) a silanol-terminated polydiorganosiloxane having a viscosity in the range of between 100 centipoises to 50,000 centipoises at 25° C. and consisting essentially of chemically combined units of the formula, $$R'_2SiO$$

(B) from about 0.01 to about 1 part, per part by weight of (A) of a silane mixture, and (C) filler, where (B) is a mixture of acyloxysilanes consisting essentially of a difunctional acyloxysilane of the formula.

$$RHSi(OCOR'')_2$$

from about 0.01 to about 0.7 part, per part by weight of said difunctional acyloxysiloxane of a polyfunctional acyloxysilane of the formula, $$R_bSiOCOR''_{4-b}$$

where R is a member selected from the class consisting of monovalent hydrocarbon radicals and halogenated monovalent hydrocarbon radicals, R' is a member selected from the class consisting of R radicals and cyanoalkyl radicals, R" is an alkyl radical, and b is a whole number equal to 0 or 1.

2. A composition protected from moisture and curable to the solid, elastic state upon exposure to moisture in accordance with claim 1 consisting essentially of by weight, (A) a silanol-terminated polydimethylsiloxane having a viscosity of 500 centipoises to 25,000 centipoises at 25° C., (B) a filler, and (C) from about 0.01 to about 0.25 part of a mixture of acyloxysilanes consisting essentially of
   (a) methyldiacetoxysilane, and (b) from about 0.005 to about 0.7 part, per part of (a) of methyltriacetoxy- 3. A composition in accordance with claim 1 where said silanol-terminated polydiorganosiloxane has a viscosity between 100 centipoises to 50,000 centipoises at 25° C.

References Cited

UNITED STATES PATENTS

| 3,032,528 | 5/1962 | Nitzsche et al. | 260—46.5 |
| 3,035,016 | 5/1962 | Bruner | 260—37 |
| 3,077,465 | 2/1963 | Bruner | 260—448.8 |
| 3,105,061 | 9/1963 | Bruner | 260—46.5 |
| 3,133,891 | 5/1964 | Ceyzeriat | 260—37 |
| 3,146,251 | 8/1964 | Brown et al. | 260—448.8 |

FOREIGN PATENTS

| 899,938 | 6/1962 | Great Britain. |

OTHER REFERENCES

Polymer Science, Vol. 50, pages 151 to 158 (1961), Interscience Publishers, Inc., New York.

DONALD E. CZAJA, *Primary Examiner.*

LEON J. BERCOVITZ, *Examiner.*

M. I. MARQUIS, *Assistant Examiner.*